United States Patent
Khondker et al.

(10) Patent No.: US 7,043,654 B2
(45) Date of Patent: May 9, 2006

(54) SELECTING A FIRST CLOCK SIGNAL BASED ON A COMPARISON BETWEEN A SELECTED FIRST CLOCK SIGNAL AND A SECOND CLOCK SIGNAL

(75) Inventors: Tanveer R. Khondker, Folsom, CA (US); Mathew B. Nazareth, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 548 days.

(21) Appl. No.: 10/334,518

(22) Filed: Dec. 31, 2002

(65) Prior Publication Data

US 2004/0128579 A1    Jul. 1, 2004

(51) Int. Cl.
*G06F 1/04* (2006.01)

(52) U.S. Cl. .................... 713/500; 713/400; 713/401; 713/503

(58) Field of Classification Search ............... 713/320, 713/400, 401, 503, 500; 327/141, 158, 163
See application file for complete search history.

(56) References Cited

U.S. PATENT DOCUMENTS

| | | | | |
|---|---|---|---|---|
| 5,537,069 A | * | 7/1996 | Volk ........................... | 327/149 |
| 5,648,988 A | * | 7/1997 | Iwamatsu et al. ........... | 375/232 |
| 6,081,145 A | * | 6/2000 | Bandai et al. .............. | 327/231 |
| 6,182,236 B1 | * | 1/2001 | Culley et al. ............... | 713/503 |
| 6,404,248 B1 | * | 6/2002 | Yoneda ...................... | 327/158 |

* cited by examiner

*Primary Examiner*—Lynne H. Browne
*Assistant Examiner*—Paul Yanchus, III
(74) *Attorney, Agent, or Firm*—Buckley, Maschoff & Talwalkar LLC

(57) ABSTRACT

According to some embodiments, a potential clock signal is selected based on a comparison between a selected first clock signal and a second clock signal.

18 Claims, 9 Drawing Sheets

SELECTING A FIRST CLOCK SIGNAL BASED ON A COMPARISON BETWEEN A SELECTED FIRST CLOCK SIGNAL AND A SECOND CLOCK SIGNAL

BACKGROUND

One or more clock signals may be distributed throughout a microprocessor to facilitate the microprocessor's operation. For example, state elements located at different points in the microprocessor die may function synchronously by operating in accordance with the clock signals.

It is known that a core Phase-Locked Loop (PLL) unit in a microprocessor can receive a reference clock signal, such as an externally generated bus clock signal, and create a core clock signal (e.g., having a frequency of N2* the frequency of the externally generated bus clock signal). The core clock signal is then provided to core state elements via a core clock distribution network (e.g., a core clock distribution tree). After being distributed, the core clock signal can be used to re-create the bus clock signal (i.e., to create a core generated bus clock signal).

Similarly, an Input Output unit (IO) PLL unit in the microprocessor can receive the externally generated bus clock signal and create an IO clock signal (e.g., having a frequency of N1* the frequency of the externally generated bus clock signal). The IO clock signal is then provided to IO state elements via an IO clock distribution network. After being distributed, the IO clock signal can be used to re-create the bus clock signal (i.e., to create an IO generated bus clock signal).

The core and IO generated bus clock signals may then be used to synchronize core and IO operations in the microprocessor. If a mis-alignment, or skew, between the core and IO generated bus clocks signals grows too large, however, information might not be properly transferred between the core and the IO. For example, differences in a core PLL unit and an IO PLL unit may result in skew between the core and IO generated bus clock signals. Similar problems can arise with other types of free-running clock systems (e.g., a clock grid). As another example, variations due to process on a core or IO clock distribution network delay could result in skew between the core and IO generated bus block signals. Such problems may become more important as clock signal frequencies increase, and the amount of skew may represent multiple core clock cycles.

It is known that skew can be reduced by adjusting a delay associated with one (or both) of the core and IO clock distribution networks. This approach, however, can require a significant default delay in the distribution networks (e.g., the network may need to have a large number of stages), which can increase clock uncertainty as well as the amount of power that is consumed by clock circuitry.

DETAILED DESCRIPTION

In the following description, particular types of integrated circuits, circuit configurations, logic blocks, and signals are described for purpose of illustration. It will be appreciated, however, that other embodiments are applicable to other types of integrated circuits, circuit configurations, logic blocks, and signals.

Moreover, some of the embodiments described herein are associated with a "clock signal." As used herein, the phrase "clock signal" may refer to any signal that is used to synchronize the operation of state elements, such as elements in a processor, router, or any other integrated circuit (or chip set) having a clock signal. A clock signal may comprise, for example, a core or IO generated bus clock signal.

Clock System

Figure 1:
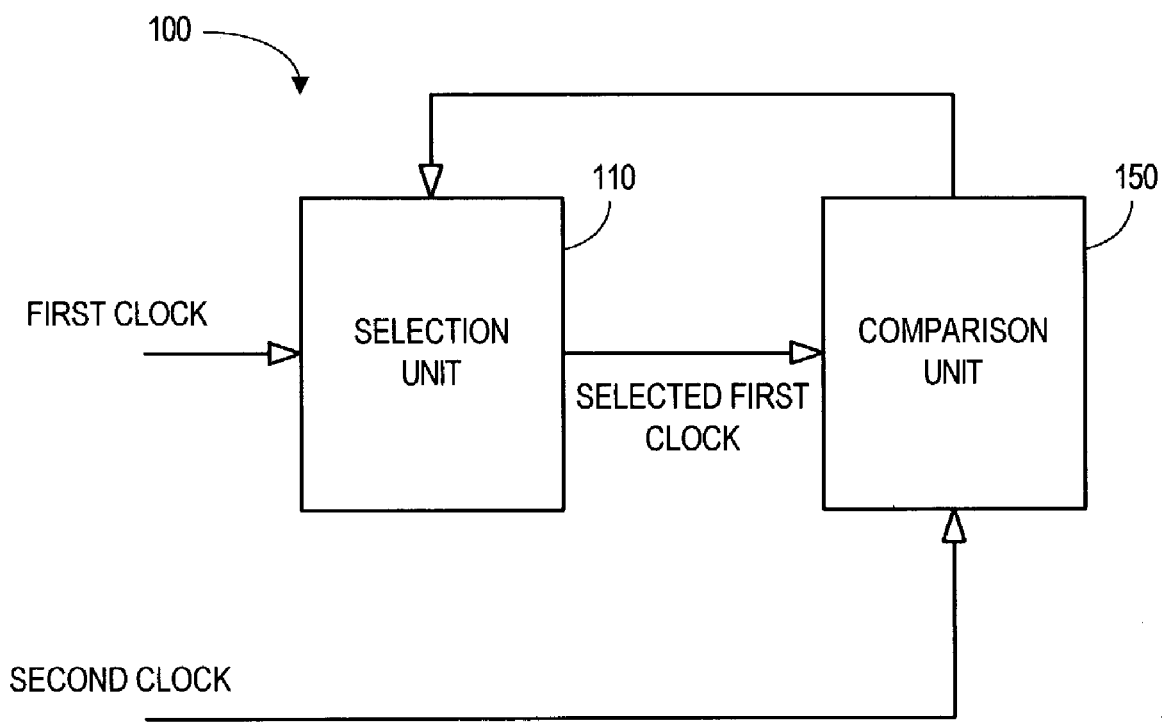
FIG. 1 is a block diagram of a clock system according to some embodiments.

FIG. 1 is a block diagram of a clock system 100 according to some embodiments. The system 100 includes a selection unit 110 that receives a first clock signal and provides a selected first clock signal. The system 100 also includes a comparison unit 150 that receives the selected first clock signal from the selection unit 110 along with a second clock signal and provides information back to the selection unit 110.

The clock signals may be associated with, for example, a microprocessor. For example, the selected first clock signal may be associated with a core generated bus clock signal and the second clock signal may represent an IO generated bus clock signal in the microprocessor. The clock signals may be generated, for example, by one or more PLL units and/or clock grids.

According to some embodiments, the selection unit 110 selects one of a plurality of potential clock signals based on information received from the comparison unit 150. For example, the selection unit 110 might generate a number of different offset first clock signals based on the first clock signal. The selection unit 110 could then select one of those offset first clock signals based on information received from the comparison unit (e.g., such that the selected first clock signal is moved forward or back to more closely match the second clock signal). In this way, an amount of skew between the selected first clock signal and the second clock signal may be reduced.

Although a separate selection unit 110 and comparison unit 150 are illustrated in FIG. 1, some or all of these functions may be combined in a single unit. Moreover, other units could also be present in accordance with embodiments of the present invention (e.g., the selection unit 110 might actually comprise a first unit to generate the offset first clock signals and a second unit to select one of the offset first clock signals). A more detailed description according to some embodiments will now be provided with respect to FIGS. 2 through 4.

Clock Cycle Delays

Figure 2:
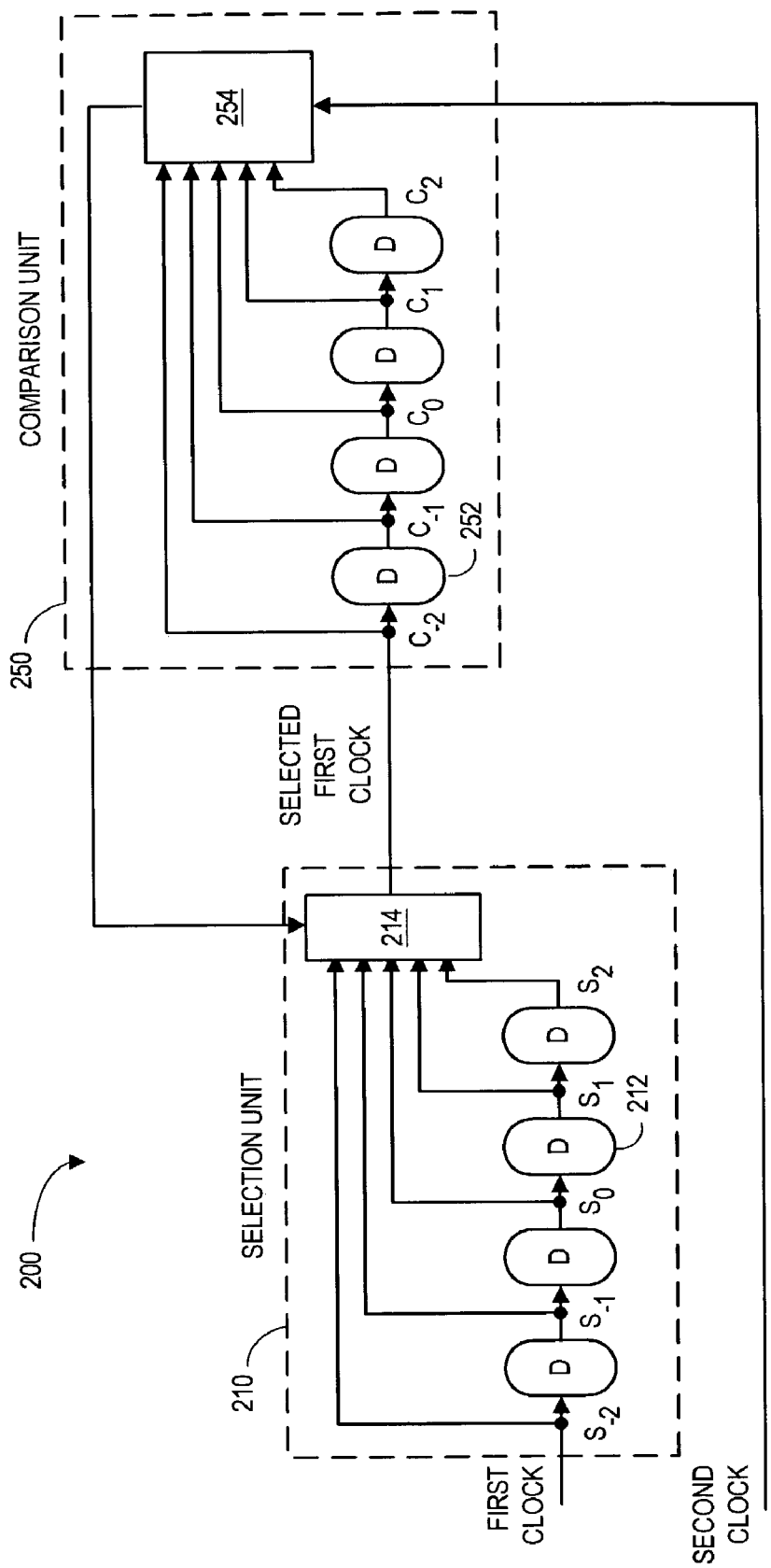
FIG. 2 is a block diagram illustrating a clock system that includes clock cycle delay elements according to some embodiments.

FIG. 2 is a block diagram illustrating a clock system 200 that includes delay elements according to some embodiments. As before, the system 200 includes a selection unit 210 that receives a first clock signal (e.g., associated with a core generated bus clock) and provides a selected first clock signal. The system 200 also includes a comparison unit 250 that receives the selected first clock signal from the selection unit 210 along with a second clock signal (e.g., associated with an IO generated bus clock) and provides information back to the selection unit 210.

According to this embodiment, the selection unit 210 includes a number of delay elements 212 (and each delay element 212 introduces an amount of delay). In this way, a number of offset first clock signals are created (i.e., $S_{-2}$, $S_{-1}$, $S_0$, $S_1$, and $S_2$). Note that may $S_0$ may represent a nominal clock signal that will be associated with the first clock signal. In this case, $S_1$ represents the nominal clock signal $S_0$ with one additional unit of delay. Similarly, $S_{-2}$ represents the nominal clock signal $S_0$ with two less units of delay. A selector 214 selects one of these signals as the selected first clock signal based on information received from the comparison unit 250.

The comparison unit 250 also includes a number of delay elements 252 (and each delay element 252 introduces an amount of delay). In this way, a number of offset comparison clock signals may be created (i.e., $C_{-2}$, $C_{-1}$, $C_0$, $C_1$, and $C_2$). A comparing circuit 254 compares these clock signals with the second clock signal and provides information about the comparison to the selection unit 210 (e.g., so that the selection unit 210 may select an appropriate $S_n$).

Figure 3:
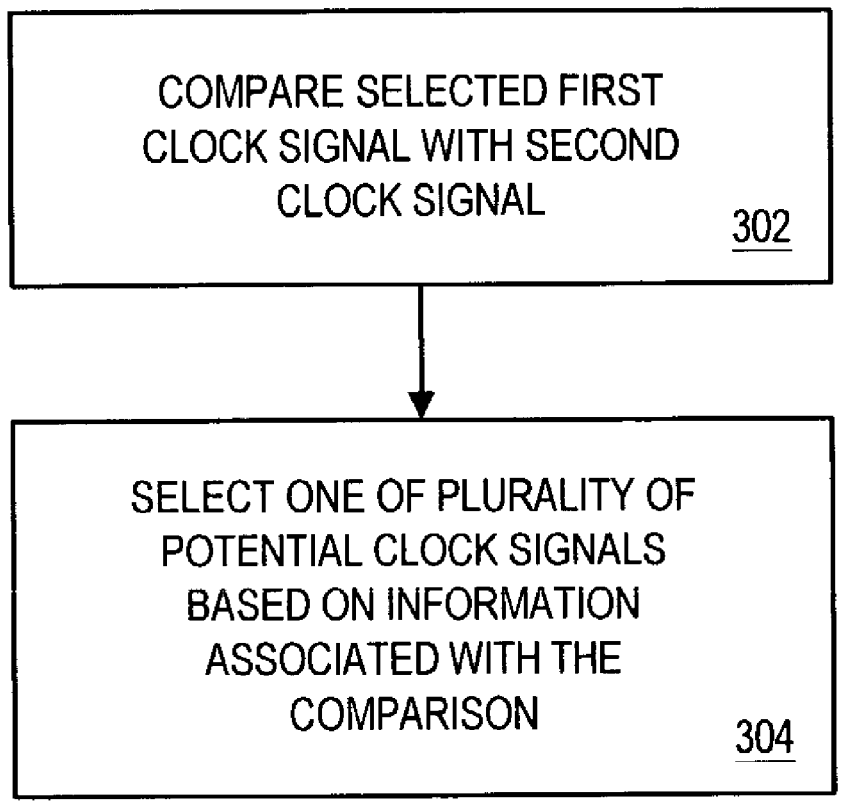
FIG. 3 is a flow chart of a method according to some embodiments.

FIG. 3 is a flow chart of a method according to some embodiments. Note that the flow chart described herein does not necessarily imply a fixed order to the actions, and embodiments may be performed in any order that is practicable.

At 302, a selected first clock signal is compared with a second clock signal. For example, the comparison unit 250 may compare the second clock signal with the offset comparison clock signals that are generated from the selected first clock signal (i.e., $C_{-2}$, $C_{-1}$, $C_0$, $C_1$, and $C_2$).

At 304, one of a plurality of potential clock signals is selected based on information associated with the comparison. For example, the selection unit 210 may select one of the offset first clock signals (i.e., $S_{-2}$, $S_{-1}$, $S_0$, $S_1$, or $S_2$) based on information received from the comparison unit 250.

Figure 4:
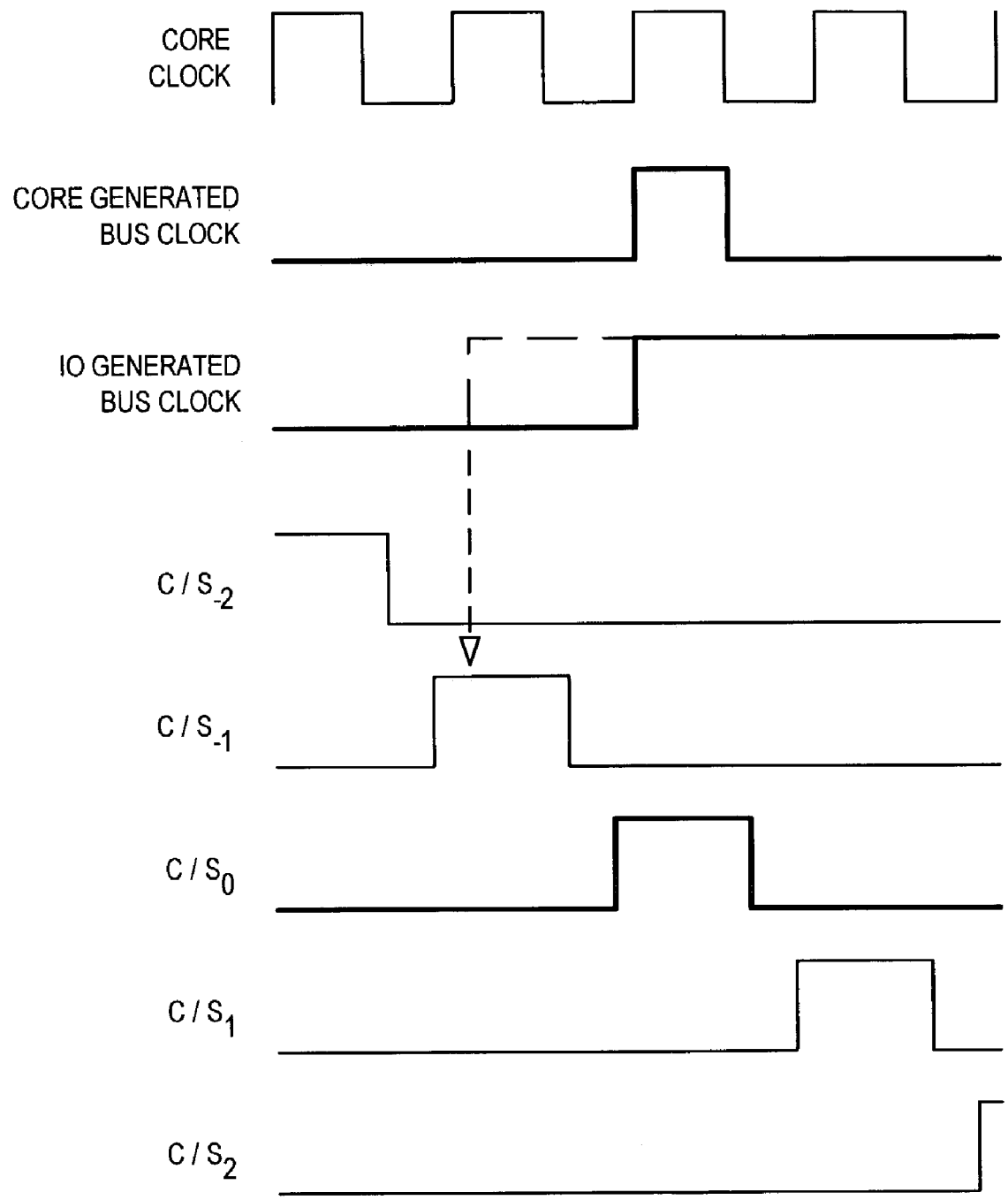
FIG. 4 illustrates clock cycles according to some embodiments.

Consider now FIG. 4, which illustrates clock cycles according to some embodiments. In particular, a core clock signal may be used to create a core generated bus block signal (e.g., a counter may be used to provide a pulse after every appropriate number of core clock cycles). The IO generated bus clock may be similarly generated based on an IO clock signal.

Recall that the selection unit 210 includes delay elements 212 that create a number of offset first clock signals $S_{-2}$, $S_{-1}$, $S_0$, $S_1$, and $S_2$. In this case, $S_0$ represents the signal that will normally be associated with the core generated bus clock.

Moreover, the comparison unit 250 includes delay elements 252 that create a number of offset comparison clock signals $C_{-2}$, $C_{-1}$, $C_0$, $C_1$, and $C_2$. Here, $C_0$ represents the clock signal that will normally match the IO generated bus clock signal.

If the comparison circuit 254 determines that $C_0$ most closely matches the IO generated bus clock signal, information is provided to the selection unit 210 such that the selector 214 will chose $S_0$ as the signal to be associated with the core generated bus clock.

Suppose, however, that the IO generated bus clock actually occurs approximately one unit of delay before the core generated bus clock because of skew (as illustrated by a dashed line in FIG. 4). In this case, the comparison circuit 254 will determine that $C_{-1}$ most closely matches the IO generated bus clock signal (i.e., because $C_{-1}$ passes through one less delay element 252 as compared to $C_0$). As a result, information is provided to the selection unit 210 such that the selector 214 will choose $S_{-1}$ as the appropriate signal to be associated with the core generated bus clock (i.e., to remove a delay element 212 from the signal and reduce the skew between the core and IO generated bus clocks).

Similarly, skew might cause the IO generated bus clock to occur approximately one unit of delay after the core generated bus clock. In this case, the comparison circuit 254 will determine that $C_1$ most closely matches the IO generated bus clock signal (i.e., because $C_1$ passes through one extra delay element 252 as compared to $C_0$). As a result, information is provided to the selection unit 210 such that the selector 214 will choose $S_1$ as the appropriate signal to be associated with the core generated bus clock (i.e., to add a delay element 212 to the signal and reduce the skew between the core and IO generated bus clocks).

EXAMPLE

Figure 5:
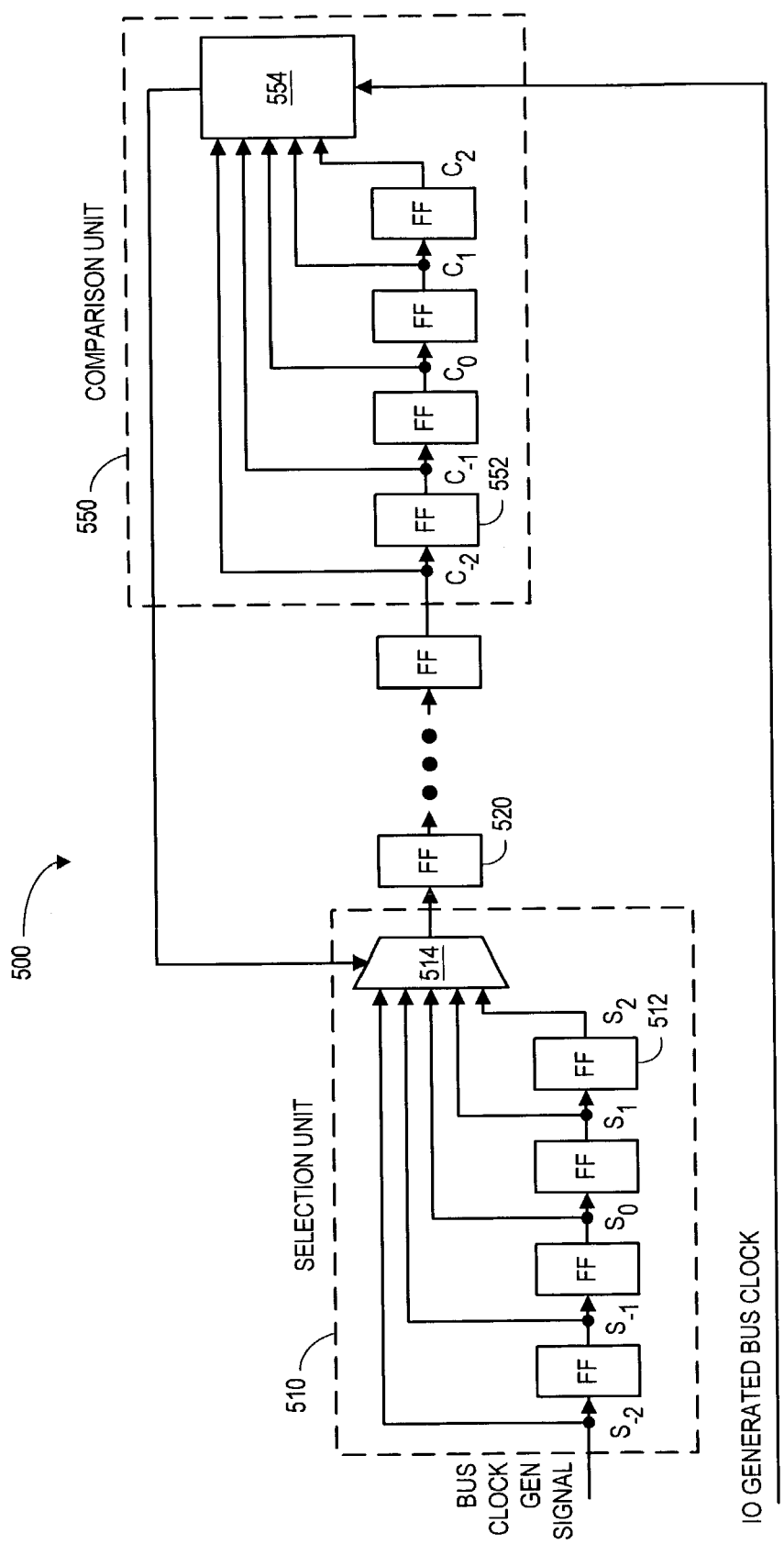
FIG. 5 is an example of a clock system according to some embodiments.

FIG. 5 is an example of a clock system 500 according to some embodiments. The system 500 includes a selection unit 510 that receives a bus clock generation signal and provides a selected bus clock generation signal. The system 500 also includes a comparison unit 550 that receives the selected bus clock generation signal from the selection unit 510 via a series of flip flops 520. The comparison unit 550 also receives an IO generated bus clock signal and provides information back to the selection unit 210.

According to this embodiment, the selection unit 510 includes a series of flip flops 512 (e.g., repeater stages) that each introduce a delay to the bus clock generation signal. In this way, a number of offset bus clock generation signals are created (i.e., $S_{-2}$, $S_{-1}$, $S_0$, $S_1$, and $S_2$). A multiplexer 514 then selects one of the offset bus clock generation signals based on information received from the comparison unit 550.

The comparison unit 250 also includes a number of flip flops 552 that each introduce a delay. In this way, a number of offset comparison clock signals are created (i.e., $C_{-2}$, $C_{-1}$, $C_0$, $C_1$, and $C_2$). A comparing circuit 554 then compares the offset comparison clock signals with the IO generated bus clock signal and provides information about the comparison to the multiplexer 514 (e.g., so that the multiplexer 514 will select an appropriate offset bus clock generation signal). For example, the multiplexer 514 might select $S_{-2}$ (to reduce the delay of the selected bus clock generation signal by two delay units as compared to $S_0$) or $S_2$ (to increase the delay of the selected bus clock generation signal by two delay units as compared to $S_0$) to reduce skew between the core and IO generated bus clock signals.

Note that may $S_0$ may represent a nominal clock signal that will be associated with the core generated bus clock signal. For example, assume that ten clock cycles are desired between the origination and destination of the core generated bus clock signal. In this case, six flip flops 520 could be included between the selection unit 510 and the comparison unit 550 (i.e., because two additional flip flops 512 will be nominally included in the selection unit 510 and another two flip flops 552 will be nominally included in the comparison unit 550). Moreover, $S_0$ might be provided to a core PLL unit as a feedback signal (after passing through an appropriate number of delay elements). That is, the feedback signal to the core PLL unit will not change based on information from the comparison unit 550 (e.g., allowing earlier or later stages to be distributed).

Also note that a core clock signal typically has a higher frequency as compared to an IO clock signal. Thus, adding core clock cycles to (or removing them from) the core generated bus clock to match the IO clock signal may provide for a more accurate adjustment as compared to adding IO clock cycles to (or removing them from) the IO generated bus clock to match the core clock signal. Either approach, however, could be used in accordance with embodiments of the present invention.

Selection Unit

Figure 6:
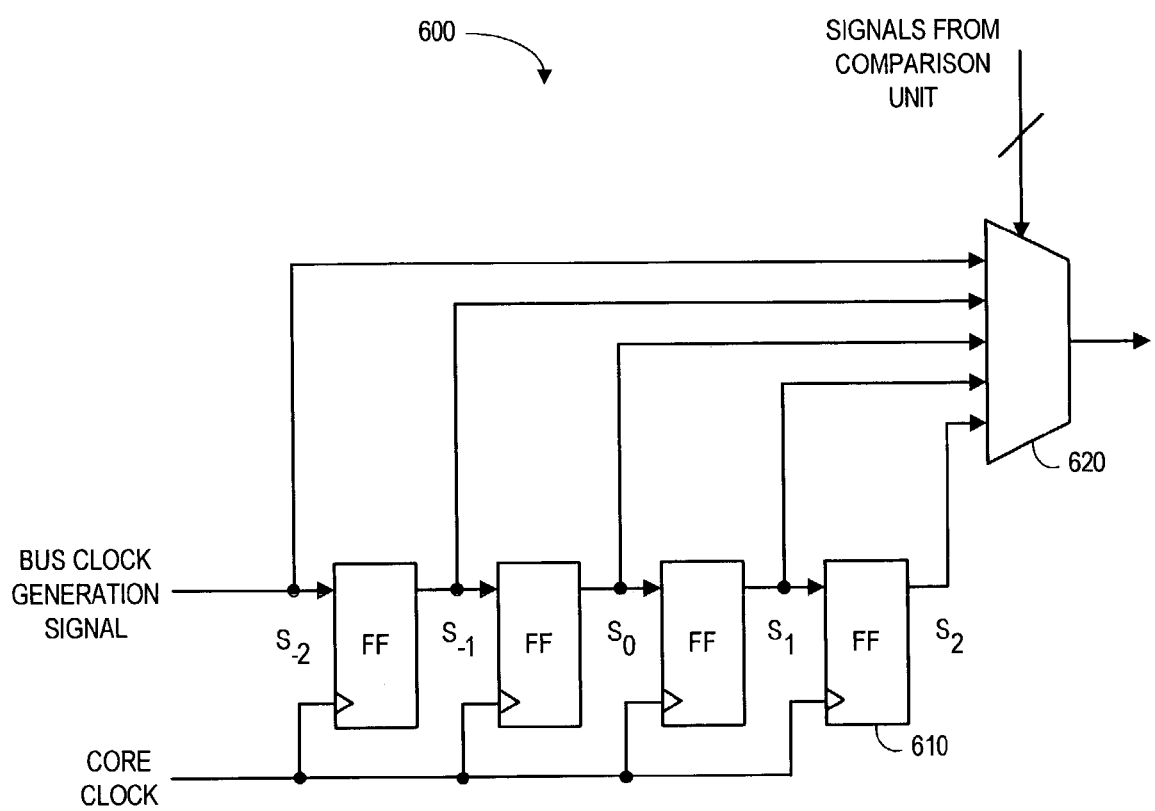
FIG. 6 is an example of a selection unit according to some embodiments.

FIG. 6 is an example of a selection unit 600 according to some embodiments. According to this embodiment, the selection unit 600 includes a chain of flip flops 610 that are each clocked by the core clock signal. In this way, each flip flop 610 introduces a delay to a bus clock generation signal to create a number of offset bus clock generation signals (i.e., $S_{-2}$, $S_{-1}$, $S_0$, $S_1$, and $S_2$). A multiplexer 620 (e.g., a 5:1 multiplexer) then selects one of these signals based on signals received from a comparison unit.

Comparison Unit

Figure 7:
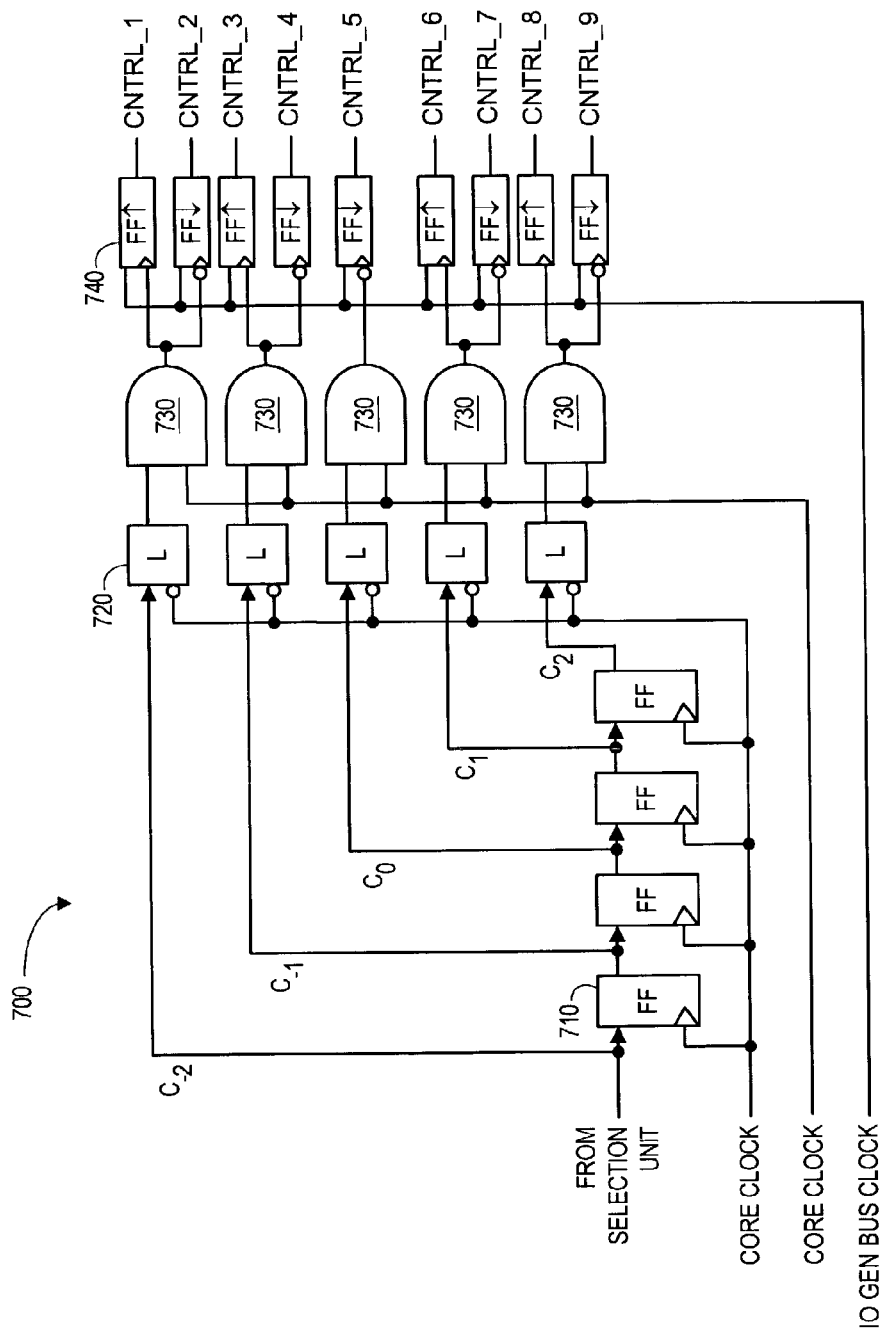
FIG. 7 is an example of a comparison unit according to some embodiments.

FIG. 7 is an example of a comparison unit 700 according to some embodiments. According to this embodiment, the comparison unit 700 includes a chain of flip flops 710 that are each clocked by the core clock signal. In this way, each flip flop 710 introduces a delay to a signal received from the selection unit 600 to create a number of offset comparison clock signals (i.e., $C_{-2}$, $C_{-1}$, $C_0$, $C_1$, and $C_2$).

Each comparison clock signal is provided to a latch 720 that also receives an inverted core clock signal. The output of each latch 720 is combined with the core clock signal via an AND gate 730. The outputs from the AND gates 730 are received by a bank of rising and falling edge flip flops 740 ("FF↑" and "FF↓" respectively). In particular, the output from each AND gate 730 associated with $C_{-2}$, $C_{-1}$, $C_1$, and $C_2$ is: (i) provided to a rising edge flip flop 740 as a clock signal, and (ii) inverted and provided to a falling edge flip flop 740 as a clock signal. The output from the AND gate 730 associated with $C_0$ is simply inverted and provided to a falling edge flip flop 740 as a clock signal. The bank of flip flops 740 also receives the IO generated bus clock signal as an input.

The latches 720, AND gates 730, and bank of flip flops 740 form a comparing circuit that generates nine control bits (i.e., "CNTRL_1" through "CNTRL_9") in accordance with the signal received from the selection unit 600 and the IO generated bus clock signal. The control bits may then be used to determine which offset core generated bus clock signal should be selected by the selection unit 600 (e.g., after the control bits are decoded and provided to the multiplexer 620).

If the nominal comparison offset signal $C_0$ most closely matches the IO generated bus clock signal, the control bits illustrated in FIG. 7 will have the following values:
CNTRL_1=0
CNTRL_2=0
CNTRL_3=0
CNTRL_4=0
CNTRL_5=1
CNTRL_6=1
CNTRL_7=1
CNTRL_8=1
CNTRL_9=1

In this case, signals are provided to the selection unit 600 such that the multiplexer 620 will choose the nominal $S_0$ as the signal to be associated with the core generated bus clock.

According to this embodiment, any skew greater than one phase of the core clock will alter these control bit values. For example, assume that the skew is such that the rising edge of the IO generated bus clock signal occurs two and one half phases before the rising edge of the core generated bus clock signal. As a result, the control bits will have the following values:
CNTRL_1=0
CNTRL_2=0
CNTRL_3=1
CNTRL_4=1
CNTRL_5=1
CNTRL_6=1
CNTRL_7=1
CNTRL_8=1
CNTRL_9=1

In this case, signals are provided to the selection unit 600 such that the multiplexer 620 will select $S_{-1}$ as the signal to be associated with the core generated bus clock. In other words, the core generated bus clock signal at the destination will be pulled in by one core clock cycle (and the remaining skew will no more than one phase of the core clock signal).

Now assume instead that the skew is such that the rising edge of the IO generated bus clock signal occurs one and one half phases before the rising edge of the core generated bus clock signal. As a result, the control bits will have the following values:
CNTRL_1=0
CNTRL_2=0
CNTRL_3=0
CNTRL_4=1
CNTRL_5=1
CNTRL_6=1
CNTRL_7=1
CNTRL_8=1
CNTRL_9=1

Here, signals are provided to the selection unit 600 such that the multiplexer 620 will select $S_{-1}$ as the signal to be associated with the core generated bus clock. In other words, the core generated bus clock signal at the destination will again be pulled in by one core clock cycle (and the remaining skew will no more than one phase of the core clock signal).

Since skew is sampled on both the rising and falling edge of the core clock signal, the multiplexer 620 can select the closet rising edge of the core clock to be associated with the core generated bus clock signal. As a result, any skew may be kept at or below one phase of the core clock signal. According to some embodiments, the control bits of FIG. 7 are decoded such that the multiplexer 620 will select offset core generated bus clock signals as follows:

TABLE I

Control Bits and Selected Offset Core Generated Bus Clock Signal

| Control Bit | | | | | | | | | |
|---|---|---|---|---|---|---|---|---|---|
| 1 | 2 | 3 | 4 | 5 | 6 | 7 | 8 | 9 | Select |
| 0 | 0 | 0 | 0 | 1 | 1 | 1 | 1 | 1 | $S_0$ |
| 0 | 0 | 0 | 1 | 1 | 1 | 1 | 1 | 1 | $S_{-1}$ |
| 0 | 0 | 1 | 1 | 1 | 1 | 1 | 1 | 1 | $S_{-1}$ |

TABLE I-continued

Control Bits and Selected Offset
Core Generated Bus Clock Signal

| \multicolumn{9}{c}{Control Bit} | |
|---|---|---|---|---|---|---|---|---|---|
| 1 | 2 | 3 | 4 | 5 | 6 | 7 | 8 | 9 | Select |
| 0 | 1 | 1 | 1 | 1 | 1 | 1 | 1 | 1 | $S_{-2}$ |
| 1 | 1 | 1 | 1 | 1 | 1 | 1 | 1 | 1 | $S_{-2}$ |
| 0 | 0 | 0 | 0 | 0 | 1 | 1 | 1 | 1 | $S_1$ |
| 0 | 0 | 0 | 0 | 0 | 0 | 1 | 1 | 1 | $S_1$ |
| 0 | 0 | 0 | 0 | 0 | 0 | 0 | 1 | 1 | $S_2$ |
| 0 | 0 | 0 | 0 | 0 | 0 | 0 | 0 | 1 | $S_2$ |
| 0 | 0 | 0 | 0 | 0 | 0 | 0 | 0 | 0 | $S_2$ |

Integrated Circuit System

Figure 8:
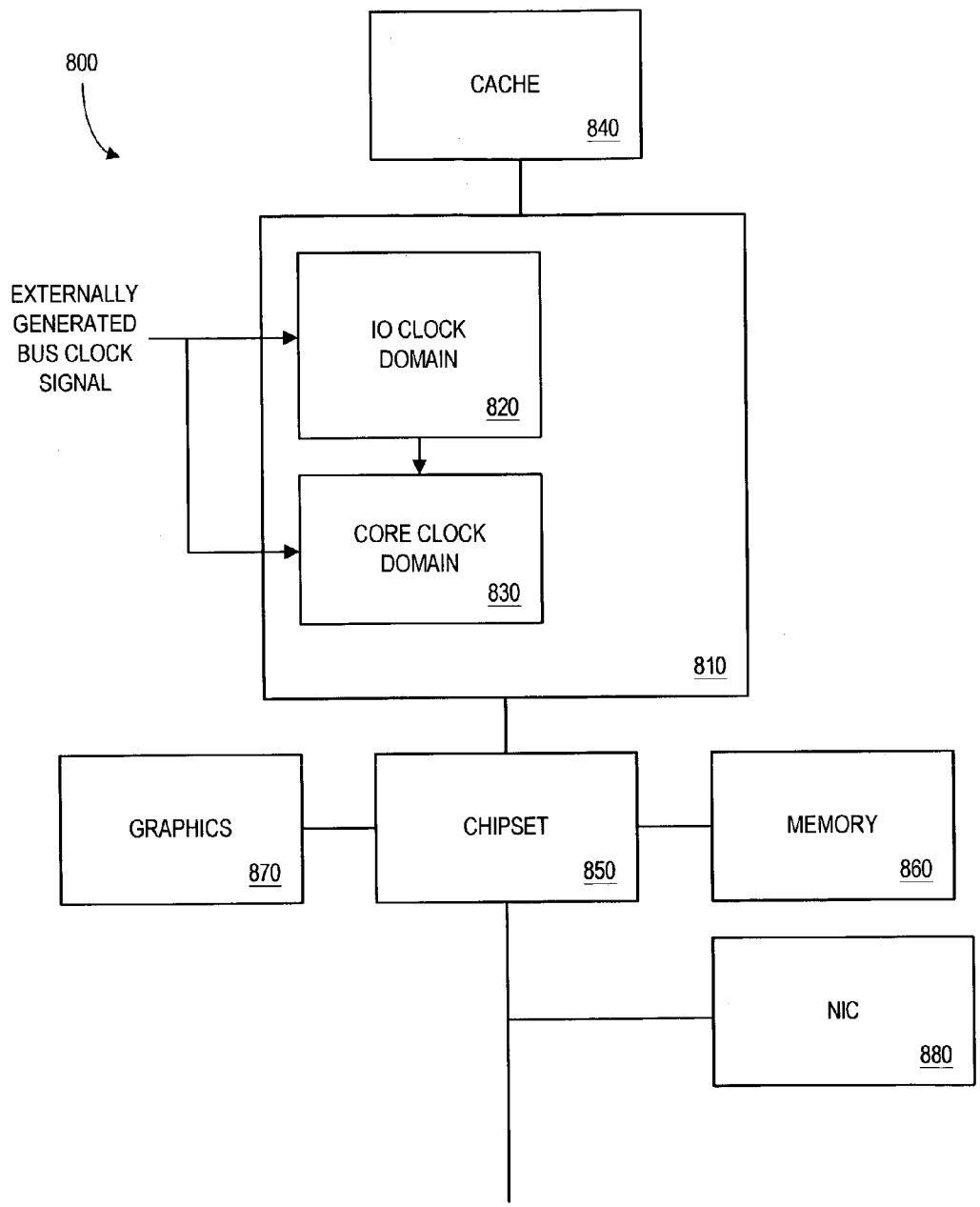
FIG. 8 illustrates a system including an integrated circuit according to some embodiments.

FIG. 8 is a system 800 including an integrated circuit 810 with an IO clock domain 820 and a core clock domain 830 according to some embodiments. The integrated circuit 810 may be a microprocessor or another type of integrated circuit. According to some embodiments, the integrated circuit 810 also communicates with an off-die cache 840. The integrated circuit 810 may also communicate with a system memory 860 via a host bus and a chipset 850. In addition, other off-die functional units, such as a graphics accelerator 870 and a Network Interface Controller (NIC) 880 may communicate with the integrated circuit 810 via appropriate busses.

The IO clock domain 820 and the core clock domain 830 each receive an externally generated bus clock signal. The core clock domain 830 also receives information from the IO clock domain 820 (e.g., an IO generated bus clock signal to be compared with a bus clock generation signal).

The core clock domain 830 may be associated with any of the embodiments disclosed herein, including those of FIGS. 1 through 7. Moreover, the integrated circuit 810 may include any number of core and IO state elements.

Microprocessor Clock System

Figure 9:
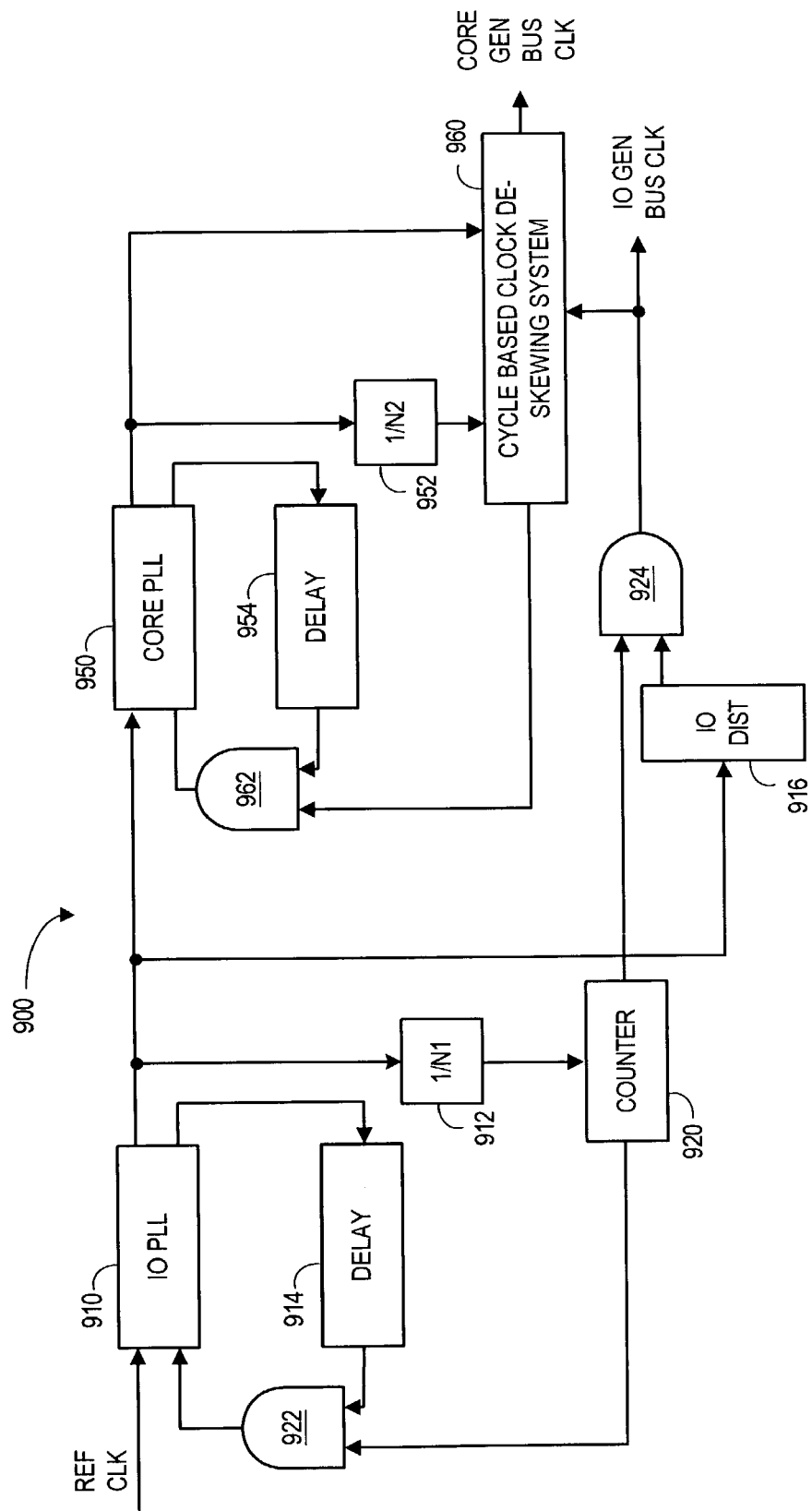
FIG. 9 is an example of a microprocessor clock system according to some embodiments.

FIG. 9 is an example of a microprocessor clock system 900 according to some embodiments. An IO PLL unit 910 receives an externally generated bus clock signal ("REF CLK") and generates an IO clock signal. The IO PLL unit 910 also receives a feedback signal via a delay 914 (e.g., a delay 914 appropriately matched to a network that distributes the IO clock signal). In this way, an IO clock signal having a frequency of N1 * the frequency of the externally generated bus clock signal can be provided to IO state elements (not shown in FIG. 9) via an IO clock distribution network 916.

The IO clock signal is also provided to a counter 920 through a divider 912 (i.e., that divides IO clock signal by N1). An AND gate 922 combines information from the counter 920 with the feedback signal from the delay 914 and provides the result to the IO PLL unit 910. Another AND gate 924 combines information from the counter 920 with the distributed IO clock signal to create the IO generated bus clock signal.

Similarly, a core PLL unit 950 receives the IO clock signal and generates a core clock signal. The core PLL unit 950 also receives a feedback signal via a delay 954 (e.g., a delay 954 appropriately matched to a network that distributes the core clock signal). In this way, a core clock signal having a frequency of N2* the frequency of the externally generated bus clock signal can be provided to core state elements (not shown in FIG. 9) via a core clock distribution network.

The core clock signal is also provided to cycle based clock de-skewing system 960 through a divider 952 (i.e., that divides core clock signal by N2). An AND gate 962 combines information from the cycle based clock de-skewing system 960 with the feedback signal from the delay 954 and provides the result to the core PLL unit 950. The cycle based clock de-skewing system 960 also receives the IO generated bus clock signal and provides the core generated bus clock signal. The core and IO generated bus clock signals may then be used to synchronize core and IO operations in the microprocessor.

The cycle based clock de-skewing system 960 may be associated with, for example, any of the embodiments described herein with respect to FIGS. 1 through 7.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, complementary signals and/or logic may be used for various embodiments, well-known circuit elements and/or signals may be implemented to or provided in a variety of different ways, and/or a variety of different host integrated circuits may implement such designs.

Moreover, although embodiments have been described with respect to core and IO generated bus clock signals, other embodiments may be associated with other types of clock signals. Similarly, although embodiments have been described with respect to separate core and IO PLL units, in other embodiments a single PLL unit may be associated with both the core and IO clock domains. In addition, other embodiments may be associated with other types of clock circuits (e.g., a clock grid).

The several embodiments described herein are solely for the purpose of illustration. Persons skilled in the art will recognize from this description other embodiments may be practiced with modifications and alterations limited only by the claims.

What is claimed is:

1. An apparatus, comprising:
   a comparison unit to compare a selected first clock signal with a second clock signal, including:
      a comparison unit input line to receive the selected first clock signal,
      a plurality of delay elements, each delay element providing an offset comparison clock signal,
      a comparing circuit to compare the offset comparison clock signals with the second clock signal, wherein the comparing circuit includes a latch to receive each comparison clock signal and a logic gate to receive information from each latch along with another clock signal; and
   a selection unit to select one of a plurality of potential clock signals based on information associated with the comparison, wherein the selection unit is to receive information from the comparing circuit and is to provide the selected first clock signal to the comparison unit via the comparison unit input line.

2. The apparatus of claim 1, wherein:
   the selected first clock signal is associated with a core generated bus clock signal in a microprocessor, and the second clock signal is associated with an Input Output generated bus clock signal in the microprocessor.

3. The apparatus of claim 2, wherein the plurality of potential clock signals are offset core generated bus clock signals.

4. The apparatus of claim 1, wherein at least one of the selected first clock signal and the second clock signal is generated via at least one of: (i) a Phase-Locked Loop unit, or (ii) a clock grid.

5. The apparatus of claim 1, wherein the selection unit comprises:
a selection unit input line to receive a first clock signal;
a plurality of delay elements, each delay element providing an offset first clock signal;
a multiplexer to select one of the offset first clock signals in accordance with a signal received from the comparison unit; and
a selection unit output line coupled to the multiplexer to provide the selected first clock signal to the comparison unit.

6. The apparatus of claim 5, wherein the delay elements are flip flops.

7. The apparatus of claim 1, wherein the delay elements are flip flops.

8. The apparatus of claim 1, wherein the logic gate is an AND gate to.

9. The apparatus of claim 8, wherein the comparing circuit includes at least one of a rising edge flip flop and a falling edge flip flop to receive a signal from each AND gate along with the second clock signal.

10. The apparatus of claim 9, wherein the comparing circuit includes a decoder to translate information from the rising edge flip flops and the falling edge flip flops into information to be provided to the selection unit.

11. A method, comprising:
comparing a selected first clock signal with a second clock signal, including;
delaying the selected first clock signal via a plurality of delay elements to generate a plurality of offset comparison clock signals,
comparing each of the offset comparison clock signals with the second clock signal, and
decoding information associated with the comparison, wherein said decoding is associated with a latch to receive each comparison clock signal and a logic gate to receive information from each latch along with another clock signal; and
selecting one of a plurality of potential clock signals based on information associated with the comparison.

12. The method of claim 11, wherein:
the selected first clock signal is associated with a core generated bus clock signal in a microprocessor, and
the second clock signal is associated with an Input Output generated bus clock signal in the microprocessor.

13. The method of claim 12, wherein the plurality of potential clock signals are offset core generated bus clock signals.

14. The method of claim 11, wherein said selecting further comprises:
delaying a first clock signal to generate a plurality of offset first clock signals.

15. An apparatus, comprising:
a comparison unit, including:
a comparison unit input line to receive a selected core generated bus clock signal,
a plurality of flip flops, each flip flop providing an offset comparison clock signal, and
a comparing circuit to compare the offset comparison clock signals with an Input Output (IO) generated bus clock signal, the comparing circuit including for each offset comparison clock signal:
a latch to receive the comparison clock signal,
an AND gate to receive information from the latch along with another clock signal, and
at least one of a rising edge flip flop and a falling edge flip flop to receive a signal from each AND gate along with the IO generated bus clock signal,
wherein the comparing circuit further includes a decoder to decode information from the flip flops; and
a selection unit to, including:
a selection unit input line to receive a signal associated with the core generated bus clock,
a plurality of flip flops, each flip flop providing an offset core generated bus clock signal,
a multiplexer to select one of the offset core generated bus clock signals in accordance with the decoded information, and
a selection unit output line coupled to the multiplexer to provide the selected core generated bus clock signal to the comparison unit.

16. The apparatus of claim 15, wherein a core Phase-Locked Loop (PLL) unit is associated with core generated bus clock signal and an IO PLL is associated with the IO generated bus clock signal.

17. A system, comprising:
a chipset; and
a die comprising a microprocessor in communication with the chipset, wherein the microprocessor includes:
a comparison unit to compare a selected first clock signal with a second clock signal, including:
a comparison unit input line to receive the selected first clock signal,
a plurality of delay elements, each delay element providing an offset comparison clock signal,
a comparing circuit to compare the offset comparison clock signals with the second clock signal, wherein the comparing circuit includes a latch to receive each comparison clock signal and a logic gate to receive information from each latch along with another clock signal; and
a selection unit to select one of a plurality of potential clock signals based on information associated with the comparison, wherein the selection unit is to receive information from the comparing circuit and is to provide the selected first clock signal to the comparison unit via the comparison unit input line.

18. The system of claim 17, wherein:
the selected first clock signal is associated with a core generated bus clock signal in the microprocessor, and
the second clock signal is associated with an Input Output generated bus clock signal in the microprocessor.

* * * * *